(No Model.)
J. WATSON.
Mower.
No. 240,345. Patented April 19, 1881.
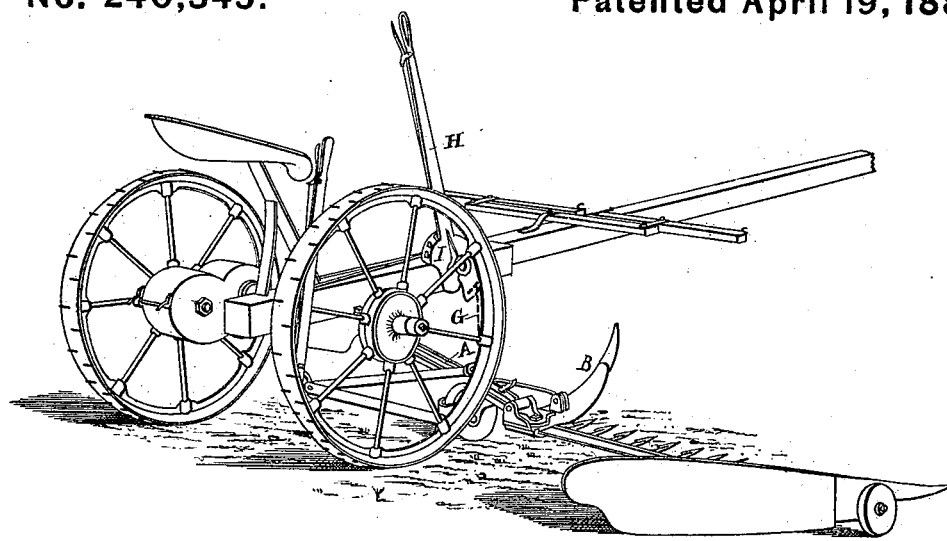
Fig. 1.
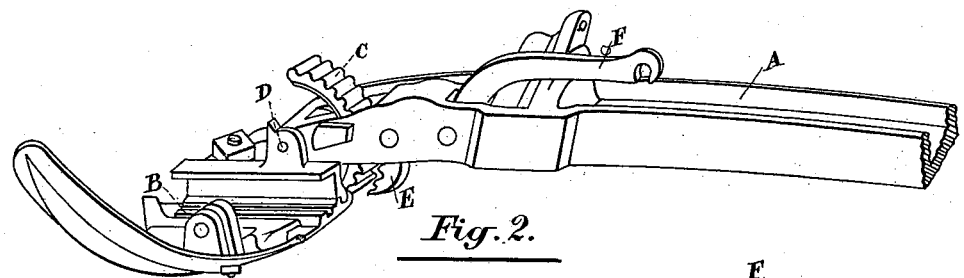
Fig. 2.
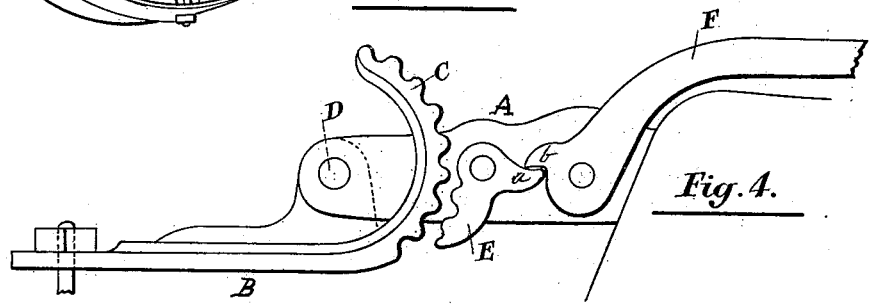
Fig. 3.
Fig. 4.
Witnesses.
A. B. Robertson
Lewis Tomlinson
Inventor.
John Watson
Per Ridout, Aird & Co
Attorneys

UNITED STATES PATENT OFFICE.

JOHN WATSON, OF AYR, ONTARIO, CANADA.

MOWER.

SPECIFICATION forming part of Letters Patent No. 240,345, dated April 19, 1881.

Application filed January 6, 1881. (No model.)

*To all whom it may concern:*

Be it known that I, JOHN WATSON, of the village of Ayr, in the county of Waterloo, in the Province of Ontario, Canada, have invented new and useful Improvements in Mowing-Machines, of which the following is a specification.

The object of the invention is to provide mechanism by which the driver can raise the finger-bar instantly along its entire length, no matter at what angle it may at the time be set; and it consists in attaching the ordinary hand-lever by a chain to a lever pivoted upon the coupling-bar, arranged to engage with a toothed pawl pivoted upon the said coupling-bar, and engaging with a toothed sector attached to or forming part of the shoe.

In the drawings, Figure 1 is a perspective view of my mowing-machine. Fig. 2 is an enlarged detail, showing the connection between the shoe and coupling-bar. Fig. 3 is a detail of the lever and pawl pivoted to the coupling-bar.

In the drawings like letters indicate corresponding parts in each figure.

In the accompanying drawings, A represents the coupling-bar, hinged to the main frame at its inner end, and pivoted to the shoe B at its outer end by the pin D. The finger-bar is attached to the shoe in the usual manner.

B represents the shoe, pivoted to the outer end of the coupling-bar by the pin D, as above described, and provided with a transverse toothed sector, C, projecting up into a slot in the coupling-bar A.

E represents a pawl, provided with a projection, *a*, and teeth adapted to engage with the teeth in the sector C. The pawl E is pivoted in the sides of the slot in the coupling-bar A.

F represents a lever pivoted in the sides of the slot in the coupling-bar A, and provided with a projection, *b*, adapted to engage with the projection on the pawl when the outer end of the lever is raised.

G represents a chain, secured at one end to the outer end of the lever F, the other end of the chain being attached to a notched sector-plate, I, to which a hand-lever, H, provided with a spring to engage in the notches in the sector, is secured near the driver's seat.

By this construction it will be perceived that, at whatever vertical angle the finger-bar may be in, the driver, by turning back the lever H, raises the outer end of the lever F, which depresses the projection *b*, which engages with the projection *a* and partially rotates the pawl E, causing its teeth to engage with the teeth in the sector-plate C, and holding the teeth of the pawl and sector-plate together, thus securely locking them and holding the finger-bar in a fixed position. By further moving backward the lever H, the coupling-bar, shoe, and finger-bar are all bodily lifted.

When the cutter-bar is in a vertical position the hand-lever H has only to be set in its sector-plate, so as to make the chain G taut, in order to secure the cutter-bar in the desired vertical position in which it should be set for shipping.

What I claim as my invention is—

1. The combination, with a shoe, B, secured to the finger-bar and pivoted to the outer end of the coupling-bar, of locking-lever F, pivoted to the coupling-bar, toothed locking mechanism, substantially as described, lever H, and chain G, whereby the finger-bar can be locked vertically or at any desired angle and lifted by the locking-lever, substantially as specified.

2. The shoe B, pivoted on the pin D to the coupling-bar A and provided with a toothed sector, C, in combination with the pawl E, pivoted to the coupling-bar A and operated by the lever F, substantially as and for the purpose specified.

3. The toothed sector C on the shoe B, pawl E, and lever F on the coupling-bar A, in combination with the chain G, hand-lever H, and notched sector I, substantially as and for the purpose specified.

JOHN WATSON.

Witnesses:
JAMES S. BLACK,
E. H. READ.